(12) United States Patent
Rothenaicher

(10) Patent No.: US 11,517,951 B2
(45) Date of Patent: Dec. 6, 2022

(54) SAFETY DEVICE FOR A MACHINE AND METHOD OF OPERATING A SAFETY DEVICE

(71) Applicant: Q-tec Prüfgeräte GmbH, Zeilarn (DE)

(72) Inventor: Otto Rothenaicher, Zeilarn (DE)

(73) Assignee: Q-tec Prüfgeräte GmbH, Zeilarn (DE)

( * ) Notice: Subject to any disclaimer, the term of this patent is extended or adjusted under 35 U.S.C. 154(b) by 231 days.

(21) Appl. No.: 16/924,892

(22) Filed: Jul. 9, 2020

(65) Prior Publication Data

US 2021/0016334 A1 Jan. 21, 2021

(30) Foreign Application Priority Data

Jul. 15, 2019 (DE) ..................... 10 2019 119 137.8

(51) Int. Cl.
| | |
|---|---|
| *B21B 33/00* | (2006.01) |
| *B21B 38/00* | (2006.01) |
| *B26D 5/00* | (2006.01) |
| *F16P 3/14* | (2006.01) |
| *G05B 19/406* | (2006.01) |

(52) U.S. Cl.
CPC .............. *B21B 33/00* (2013.01); *B21B 38/00* (2013.01); *B26D 5/007* (2013.01); *F16P 3/144* (2013.01); *G05B 19/406* (2013.01)

(58) Field of Classification Search
CPC ......... B21B 33/00; B21B 38/00; B26D 5/007; F16P 3/144; G05B 19/406
USPC ........................................................ 340/555
See application file for complete search history.

(56) References Cited

U.S. PATENT DOCUMENTS

| | | | | |
|---|---|---|---|---|
| 7,442,917 B1* | 10/2008 | Rollins | ..................... | G01V 8/22 |
| | | | | 250/221 |
| 2003/0164447 A1* | 9/2003 | Kudo | ...................... | F16P 3/144 |
| | | | | 250/221 |
| 2006/0197020 A1* | 9/2006 | Trzecieski | .............. | F16P 3/142 |
| | | | | 250/342 |
| 2018/0365550 A1* | 12/2018 | Brown | ..................... | G01V 8/20 |

FOREIGN PATENT DOCUMENTS

| | | |
|---|---|---|
| CH | 696785 A5 | 11/2007 |
| DE | 102009054491 A1 | 6/2011 |
| DE | 202014102335 U1 | 8/2015 |
| DE | 102016211349 A1 | 12/2017 |
| EP | 0716907 A1 | 6/1996 |

(Continued)

*Primary Examiner* — Kam Wan Ma
(74) *Attorney, Agent, or Firm* — Barlow, Josephs & Holmes, Ltd.; David R. Josephs

(57) ABSTRACT

The invention is directed to a safety device for a machine that includes a first transceiver unit for emitting a first light beam in a first time slot and for receiving a second light beam. The safety device includes a second transceiver unit arranged for emitting the second light beam in a second time slot that is different from the first one. The safety device also includes an evaluation unit for determining a reflecting object between the first transceiver unit and the second transceiver unit, only if the first light beam is received by the first transceiver unit in the first time slot or the second light beam is received by the second transceiver unit in the second time slot. Additionally, a non-reflecting object may be detected, if by neither of the two transceiver units in both time slots one of the two light beams is received.

15 Claims, 5 Drawing Sheets

(56) References Cited

FOREIGN PATENT DOCUMENTS

Figure 1:
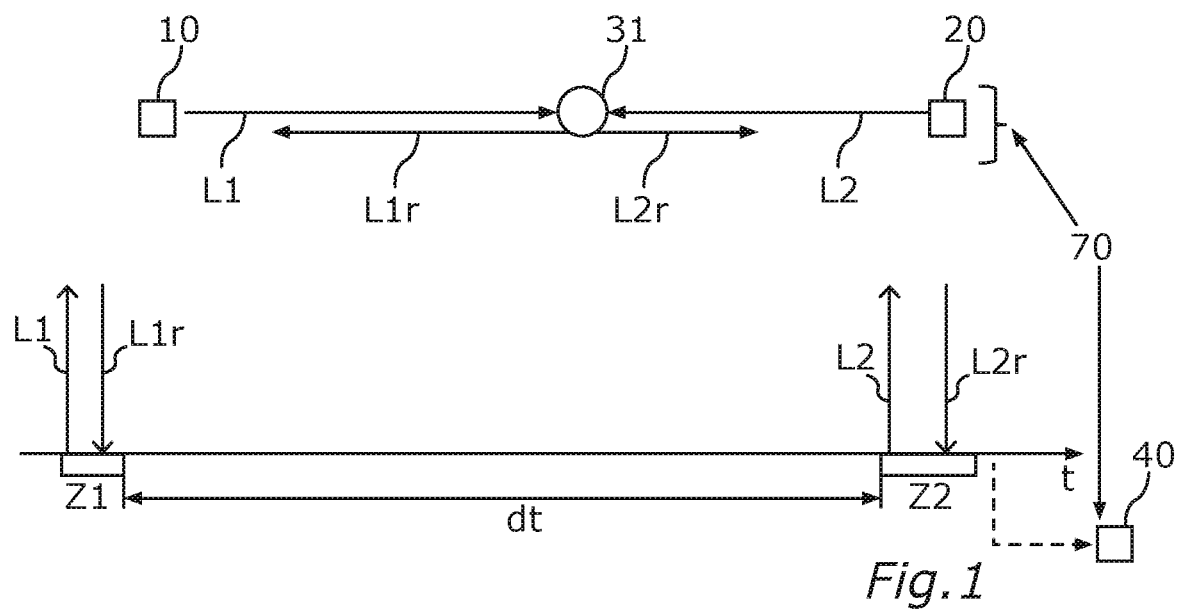

| EP | 1870734 | A1 | 12/2007 |
| EP | 2045628 | A1 | 4/2009 |
| EP | 2180348 | A1 | 4/2010 |
| EP | 2431768 | A1 | 3/2012 |

\* cited by examiner

SAFETY DEVICE FOR A MACHINE AND METHOD OF OPERATING A SAFETY DEVICE

BACKGROUND OF THE INVENTION

The invention relates to a safety device for a machine. Preferably, the safety device is configured as a non-contact protection device. Further, the invention relates to a corresponding method for safely operating a machine.

Despite increasing automation still machines and plants are employed which require manual operation. In the case of machines, such as for example rolling mills, crushing plants, presses with manual feed, circular saws, shredder machines or cutting tools, generally there is a considerable potential danger for an operator. Due to the required operation of the machine by the operator the requirement exists to equip the machine or plant with protection elements and/or safety mechanisms.

The invention is based on the finding that hitherto safety concepts for machines either provide insufficient protection for the operator or frequently lead to undesired unnecessary false shutdowns since already in the case of harmless deviations of the underlying safety concept an emergency shutdown is performed. An insufficient protection may for instance occur due to the fact that hands or parts of the body of an operator cannot be differentiated from machine elements or workpieces to be processed. This is for instance the case with classic light barriers or light curtains.

Such light curtains are triggered by interruptions of the light signal or the reflecting light signal. If an object enters a response area of the light curtain, the safety function is triggered. A further principle is the triggering by a reflecting element (bracelet, glove, or reflecting workpiece), which allows for a recognizing of exclusively reflecting parts. In this connection it is disadvantageous that a triggering or an interruption is effected exclusively by the reflecting object. Common light curtains responding to the interruption effected by a reflecting element cannot recognize non-reflecting components. A permanent self-monitoring of the light curtain is not possible.

Whilst by the conventional light curtain an intrusion of the object can be detected, however, thereby it cannot be determined whether this intrusion is safety-critical or even desired. Frequently, in such cases due to the high safety requirements in case of doubt an emergency shutdown of the machine in question is initiated. If, in retrospect, the performed shutdown proves to be a false trigger, this may lead to considerable disruptions and/or even product damages. It is true that a certain level of safety could be reached, however, only at a clearly raised risk of triggering unnecessary false shutdowns involving the described disadvantages. A necessary reaching through of tools or components cannot be realized without loss of safety.

Frequently, hazardous spots in machines such as for instance feed portions are protected as far as possible by mechanical covers. In portions that are not covered, often emergency stop elements such as for instance switches, brackets, cable control triggers, or knee switch mats are positioned in reaching or operation proximity. However, so far a reliable or even absolute protection is not provided by these elements, either.

SUMMARY OF THE INVENTION

The object of the present invention may be seen in being able to provide a safer and more efficient manual operation of a machine.

According to the invention this object is achieved by a safety device for a machine and a method for operating a safety device for a machine. Advantageous further developments and alternative embodiments of the invention may be gathered from the dependent claims, the description, as well as the figures.

The invention provides a safety device for a machine. The term "machine" may in particular relate to an industrial machine. The machine may for instance be configured as rolling machine, cutting machine, press, shredding machine etc. The safety device is preferably provided for machines which may present a danger for a user during operation. The safety device comprises a first transceiver unit for emitting a first light beam in a first time slot. The first transceiver unit is employed for receiving a second light beam in the first time slot. The safety device further comprises a second transceiver unit, which is arranged for emitting the second light beam in the second time slot that is different from the first one. The second transceiver unit is configured for receiving the first light beam in the second time slot. The second transceiver unit may receive or capture light beams emitted or sent out by the first transceiver unit. The transceiver units may both emit as well as receive light beams. The receiving of light beams may be equated with capturing or registering the light beams.

The safety device comprises an evaluation unit. The evaluation unit is configured to determine a reflecting object between the first transceiver unit and the second transceiver unit, only if the first light beam is received by the first transceiver unit in the first time slot or the second light beam by the second transceiver unit in the second time slot. Additionally or alternatively, the evaluation unit is configured to determine a non-reflecting object, only if by neither of the two transceiver units in both time slots one of the two light beams is received. Thus, the evaluation unit is in particular configured to determine the reflecting object between the first and the second transceiver unit only if the first light beam is received by the first transceiver unit in the first time slot or the second light beam is received by the second transceiver unit in the second time slot. Additionally or alternatively, the evaluation unit is in particular configured to determine the non-reflecting object only if neither of the two transceiver units receives in both time slots one of the two light beams.

The light beam may be configured as light signal, light pulse, or monochromatic light beam. The light beam may contain an identification information. In this case every light beam may be locally and/or temporally assigned to the respective transceiver unit. Preferably, it may be indicated by which transceiver unit the respective light beam is emitted. The light beam may be configured as infrared light. In this case both light beams are non-visible to a human eye. Thus, a non-visible safety device may be provided for the machine. For instance a wave length of the light beams may amount to 0.7 micrometer to 1000 micrometer. The first time slot and the second time slot may each be regarded as time periods. The time slots may each be defined by two points in time. Thus, a starting time as well as an end time may define the first or second time slot. This definition of the time slot may be transferred to all further following time slots. Preferably, a sequence of first and second time slot repeats periodically. This periodic repetition may follow a clock rate or the periodic repetition may depend on the clock rate or orientate itself by the clock rate.

The transceiver unit may comprise an optical system arranged in front. This optical system arranged in front may for instance be configured to facilitate the emitting and/or receiving of the light beams or render it more efficient. In the case of several first transceiver units and several second transceiver units several first light beams or several second light beams, respectively, may be emitted and received. These several light beams may span a light barrier or form a light curtain. If an object intrudes into this light barrier or the light curtain, at least one light beam is affected with regard to its propagation. If for instance a reflecting object enters in between the first transceiver unit and the second transceiver unit, both light beams are correspondingly reflected back. In this situation the first light beam would be received by the first transceiver unit in the first time slot. At the same time the second light beam would be received by the second transceiver unit in the second time slot. Preferably, the first time slot is temporally offset from the second time slot. The terms light barrier and light curtain may be regarded as synonyms. Equally, the terms interval and time offset may be regarded as synonyms.

A temporal expansion of the time slots preferably orientates itself by a running time of the light beams from the first transceiver unit to the second transceiver unit. In the case of an exemplarily assumed distance of one meter between the first and second transceiver unit a running time of about 3 nanoseconds (3 ns) results by using the known velocity of light. Accordingly, it may make sense that the time slots have a temporal expansion in the range of nanoseconds. The concrete value concerning the temporal expansion of the time slots may be individually adapted for the machine to be secured. The second time slot preferably has a predetermined time offset from the first time slot. This predetermined time offset may for instance be in the range of few milliseconds. It may for instance amount to three to five milliseconds (5 ms). Preferably, the value of the time offset is configured to be clearly larger than the value relating to the temporal expansion of the time slots. Thus, a non-visible safety device for a machine may be provided, which at the same time may perform a classification of the captured object. The safety device may thus differentiate as to whether the captured object is configured to be reflecting or non-reflecting.

These different objects may each be associated with different safety measures. It may for instance be envisaged that in the case of a reflecting object the evaluation unit is configured to generate a first control signal for immediate shutdown of the machine. In the case of the non-reflecting object the evaluation unit may be configured to envisage no further measures to start with or to generate a second control signal for adapted operating of the machine.

A user is frequently asked to use a reflection bracelet whilst operating the machine. In some cases it may be envisaged that already for activating the machine it is required to wear reflection bracelets. If the evaluation unit detects the non-reflecting object, this object might be a robot arm that is authorized to pass the light barrier. In this case in the majority of cases it is precisely not desired that an emergency shutdown of the machine is initiated. Here the safety device can recognize whether the object affecting the light beams is reflecting or non-reflecting. In the case of determining the reflecting object an emergency shutdown may be envisaged as a consequence. Preferably, the evaluation unit is configured to initiate an emergency shutdown only when determining a reflecting object or a non-reflecting object. Thus, it is preferably envisaged that the evaluation unit in the case of determining the reflecting object generates a different control signal for the machine than in the case of determining the non-reflecting object. In this way a dangerous area in a machine can be reliably secured and at the same time a risk of an undesired or unnecessary false shutdown can be reduced.

An additional or alternative embodiment envisages a safety device, wherein the control unit is configured to determine a functionality of the safety device, only if the first light beam is received by the second transceiver unit in the first time slot and/or the second light beam is received by the first transceiver unit in the second time slot. The determining of the functionality of the safety device may be referred to as function check. Therein in particular a functionality of the safety device is checked.

If there is no object between the first and second transceiver unit, the light beams can each propagate unhindered in between. In this situation the respective light beam travels in the same time slot from the emitting transceiver unit to the receiving transceiver unit. Due to the velocity of light of about $3\times10^8$ m/s in this situation the respective light beam after the emitting immediately or "at once" arrives at the opposite transceiver unit. The evaluation unit may be configured to perform the function check at regular intervals. The determining of the functionality of the safety device may additionally or alternatively be continuously or permanently performed. By determining the functionality or by the function check a defect in the safety device for the machine may be recognized at an early stage.

If for instance between the first and second transceiver unit there is no object arranged or present, a failure of the safety device for the machine may be assumed, in case the evaluation unit determines a reflecting object or a non-reflecting object nonetheless. If the evaluation unit for instance at the second transceiver unit cannot determine a receiving of light beams, this may indicate a defect of the second transceiver unit. In this case the first light beam cannot be received from the second transceiver unit. If between the first and the second transceiver unit the receiving of light beams is interrupted by a non-reflecting object and the interruption is not similar in position (in particular opposite), this may equally be indicative of a defect of a transceiver unit.

An additional or alternative embodiment envisages that the evaluation unit is configured to generate based on the determining of the reflecting or non-reflecting object a predetermined control signal for the machine. Preferably, the evaluation unit does not exhaust itself in merely determining whether a captured object is configured to be reflecting or non-reflecting. Since machines are frequently operated by operators with reflection bracelets, the evaluation unit may preferably be configured to generate a first control signal for switching off or deactivating the machine in the case of determining the reflecting object. Ideally the first control signal is generated immediately after the determining of the reflecting object. This first control signal is further configured to cause a shutdown of the machine or an immediate emergency shutdown of the machine. If the user for instance wears a reflection bracelet around his or her wrist and if the evaluation unit determines the reflecting object, this is very likely to mean that the hand of the user is approaching a dangerous area of the machine. Such situation is to be rated as extremely dangerous. For this reason the evaluation unit is preferably configured to cause or perform an immediate and prompt shutdown of the machine in the case of determining or recognizing the reflecting object. Thereby an injury of the hand of the operator can be reliably prevented.

However, if instead of the reflection bracelet a non-reflecting robot arm passed the light curtain formed by the light beams, the evaluation unit is preferably configured to cause no emergency shutdown of the machine for the time being. The determining of the non-reflecting object may even represent a desired operation. The evaluation unit may generate a second control signal for the machine that is different from the first control signal. Thus, the safety device can differentiate between desired operations and situations that are dangerous for the operators. However, it is also possible to assign the emergency shutdown or the first control signal to the non-reflecting object. This would make sense for instance if the robot arm has a reflecting surface.

An additional or alternative embodiment provides a safety device, wherein the first time slot is temporally separate from the second time slot by a predetermined interval. This predetermined interval exceeds in particular a running time of the first light beam from the first to the second transceiver unit. The running time may be defined analogously by the second light beam. The predetermined interval preferably amounts to few milliseconds. It may for instance amount to 2, 3, 4, 5, 6, 7, 8, 9, or 10 milliseconds. The running time of the light beams or of the first light beam preferably amounts to merely few nanoseconds, frequently less than 10 ns. The running time of the light beams orientate themselves preferably by the time period required by the light beams to travel from the first to the second transceiver unit. Due to the velocity of light this running time is clearly smaller than one millisecond. Preferably, the temporal expansion of the time slots corresponds to the running time of the first light beam the first to the second transceiver unit. The temporal expansion of the time slots may amount to a multiple of the running time. For instance the first time slot or the second time slot may be double the size of the running time. Thereby it may be ensured that the first time slot is temporally clearly separate from the second time slot. In this way it may be reliably determined by the evaluation unit whether the first or second light beam is received in the first or second time slot. In the case of a predetermined interval of about three milliseconds the non-reflecting object may still be reliably determined. In the case of the predetermined interval amounting to three milliseconds it is nearly impossible that an object passes a light curtain formed by the light beams without being noticed or determined.

An additional or alternative embodiment provides a safety device comprising several first transceiver units and several second transceiver units. Therein, each first transceiver unit is assigned a second transceiver unit for receiving the first light beam. Preferably, the safety device has as many first transceiver units as second transceiver units. Each first transceiver unit may be assigned exactly one of the several second transceiver units. One each of the first transceiver units as well as the associated second transceiver unit may be referred to as a sensor pair. The evaluation unit is preferably configured to determine with regard to each sensor pair the reflecting or non-reflecting object. Thus, the information acquired by the evaluation unit may be locally resolved.

The several first transceiver units as well as the several second transceiver units may be subdivided into different groups. The evaluation unit may in particular be configured to generate depending on the group of several transceiver units a control signal for the machine. For instance, upon determining an object, by a first group of several transceiver units the first control signal may be generated, whereas the evaluation unit, upon determining an object, by a second group of several transceiver units generates the second control signal. The second control signal may for instance be configured to trigger an alarm but not a shutdown of the machine. The first control signal may be configured to cause an immediate shutdown of the machine. Thus, by the several first and second transceiver units different protection zones may be defined or formed around a predetermined portion of the machine. Moreover, by several first and second transceiver units the predetermined portion in the machine may be reliably and completely monitored. Moreover, by the several first and second transceiver units a corresponding local resolution of the detected object may be effected. In this way the safety device may be adapted more precisely to the respective machine.

An additional or alternative embodiment envisages that the several first transceiver units are arranged along a first line. The several second transceiver units are arranged along a second line. Therein the first line is configured to be congruent with the second line. In other words, the several first transceiver units form a first arrangement of the several first transceiver units. This arrangement in particular corresponds to the respective positions of the several first transceiver units. In analogy thereto, by the several second transceiver units a corresponding second arrangement may be defined. Therein the first arrangement is configured to be preferably congruent with the second arrangement. This means in particular that the first arrangement by a congruence mapping can be transformed into the second arrangement. A congruence mapping is for instance a parallel shift, rotation, reflection and/or point reflection. The several first and second transceiver units may in particular alternately emit or receive several light beams.

The several first transceiver units may for instance be arranged along a printed circuit board. The same may apply in analogy to the several second transceiver units. Due to the congruence of the first line with the second line, starting from the first transceiver unit a position of the second transceiver unit may easily be determined. This may help to allow for performing the determining of an object more reliably and faster.

An additional or alternative embodiment envisages that the several first transceiver units and the several are each arranged in a rectilinear, semi-circular, circular, U-shaped, and/or rectangular manner. By a rectangular arrangement of the several first and second transceiver units a cuboid light barrier or a cuboid light curtain may be formed around a predetermined dangerous area of a machine. In the case of a rolling machine comprising cylindrical rolls correspondingly a U-shaped or semi-circular arrangement of the several transceiver units may be expedient. The afore-mentioned advantages and examples apply mutatis mutandis and in analogy to this embodiment.

An additional or alternative embodiment provides a safety device comprising a machine, in particular a rolling machine. The evaluation unit is configured to switch off the machine in the case of detecting the reflecting object. Alternatively, the evaluation unit may be configured to switch off the machine in the case of detecting the non-reflecting object.

The evaluation unit may thus be operated in various operating modes. In a first operating mode it may be configured to switch off the machine only upon determining the reflecting object. In a second operating mode the evaluation unit may be configured to switch off the machine only in the case of determining the non-reflecting object. In connection with the preceding embodiments, examples, and advantages the machine can be safely manually operated by a user by the safety device. At the same time an unintended and undesired false shutdown of the machine can be avoided. The named examples and advantages mutatis mutandis and in analogy equally apply to this embodiment.

An additional or alternative embodiment envisages that the several first and second transceiver units are arranged in such a way that a predetermined area of the machine is accessible only by determining the reflecting object and/or by determining the non-reflecting object. Preferably, the several first and second transceiver units are arranged in such a way that the predetermined area of the machine is accessible or reachable only when determining the reflecting object and/or when determining the non-reflecting object. Accordingly, a user cannot approach the predetermined area without being noticed by the evaluation unit. The predetermined area of the machine is in particular a dangerous area. During operation of the machine the user or a body part of the user should not approach or enter the dangerous area. Therefore, the several first transceiver units in this embodiment are preferably arranged accordingly in the surroundings of the predetermined area. It is also possible that merely for the user possible accesses are secured by the first and the second transceiver units. By the corresponding arrangement of the several first and second transceiver units in each case a corresponding light curtain or a light barrier may be generated. This light barrier or several light barriers are expediently arranged in such a way that an access for a user is possible only by determining the reflecting and/or non-reflecting object. Thus, it may be ensured that the user in no case may approach the predetermined area or may intrude into the predetermined area without being noticed by the evaluation unit. The aforementioned advantages and examples apply mutatis mutandis and in analogy to this embodiment.

The invention equally envisages a method for operating a safety device for a machine. This method comprises the following method steps. To begin with, a first light beam is emitted in a first time slot by a first transceiver unit. A second light beam in a second time slot that is different from the first one is emitted by a second transceiver unit. The transceiver units are configured to receive, capture, or register the two light beams.

A determining of a reflecting object between the first transceiver unit and the second transceiver unit is effected only if the first light beam is received by the first transceiver unit in the first time slot or the second light beam is received by the second transceiver unit in the second time slot. Additionally or alternatively, a non-reflecting object is determined between the first transceiver unit and the second transceiver unit, only if by neither of the two transceiver units in both time slots one of the two light beams is received. The features, advantages, and examples relating to the already described embodiments apply mutatis mutandis and in analogy to the method.

Thus, corresponding advantages, examples, and features of the embodiments may be transferred mutatis mutandis and in analogy to the method. Equally, method features may be interpreted as corresponding device features. Thus features, advantages, and examples of the method may be transferred mutatis mutandis and in analogy to the embodiments.

An additional or alternative further development of method envisages that the emitting of the first light beam is performed temporally offset from the emitting of the second light beam with a predetermined time offset. Due to the temporally offset emitting of light beams a receiving of the respective light beams in the first or second time slot, respectively, occurs. Therein the time offset is ideally chosen in such a way that entering the dangerous area of the machine without being noticed is not possible. The advantages and examples named in the embodiments apply mutatis mutandis and in analogy to this method.

An additional or alternative further development of the method envisages that the first light beam and the second light beam are emitted in an alternately periodically repeating manner. The method preferably is not limited to emitting the first and the second light beam once each. Preferably, the first and the second light beam are emitted regularly repeating. The first light beam may be emitted at a first clock rate. The second light beam may be emitted at a second clock rate. These two clock rates may be equal. The emitting of the respective light beams therein is effected ideally at a predetermined clock rate. This clock rate preferably orientates itself by the predetermined time offset between the first and second time slot.

An additional or alternative further development of the method envisages that a functionality of the safety device is determined, only if the first light beam is received in the first time slot by the second transceiver unit and the second light beam is received by the first transceiver unit in the second time slot. The named advantages and examples of the embodiments apply mutatis mutandis and in analogy to this method.

An additional or alternative further development of the method envisages that an error signal is generated if during a predetermined time period neither of the two light beams is received by the first transceiver unit and/or the second transceiver unit. In this case at least one of the two transceiver units does not receive a light beam. This means that one of the two transceiver units does not detect a light signal or a light beam for the predetermined time period. This situation may be indicative of a defect of the safety device. For this reason the further development of this method envisages that an error signal is generated. Thereby a defect in the safety device can be identified or removed in good time. It may additionally be envisaged that an operation or a switching on of the machine is no longer possible after the error signal has been generated. Thereby it can be avoided that the machine is operated or started without the safety device. Thus, a high safety level with regard to the operating of the machine can be achieved.

The advantages and embodiments named in connection with the safety device according to the invention and the corresponding machine may be realized in analogy also in the method according to the invention. This means that the features of the safety device may be implemented as corresponding functional features of the method according to the invention.

BRIEF DESCRIPTION OF THE DRAWING FIGURES

The invention is now explained in more detail based on the enclosed figures. These figures represent exemplary embodiments or possibilities of realizing the invention. The indicated features and examples, however, do not limit the essential content of the invention.

Figure 2:
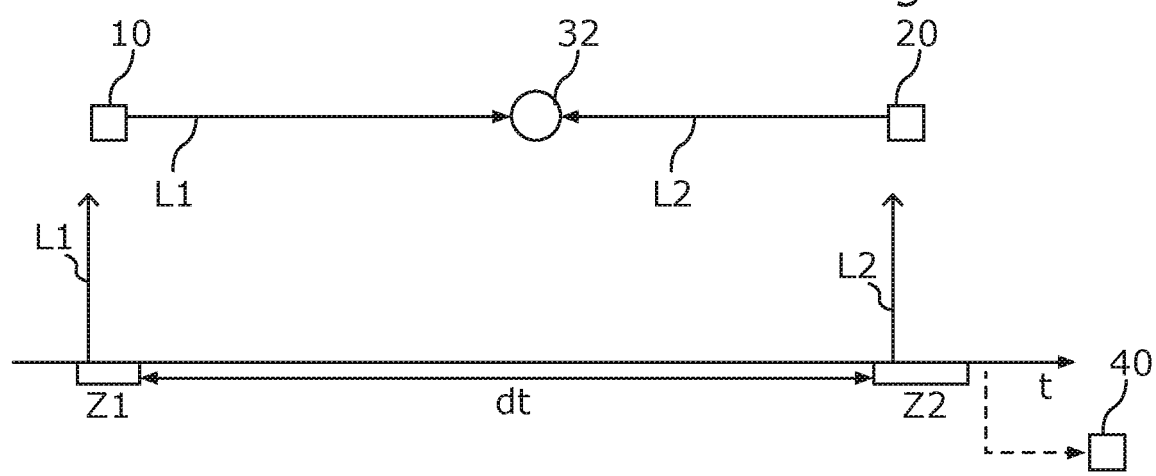
Figure 3:
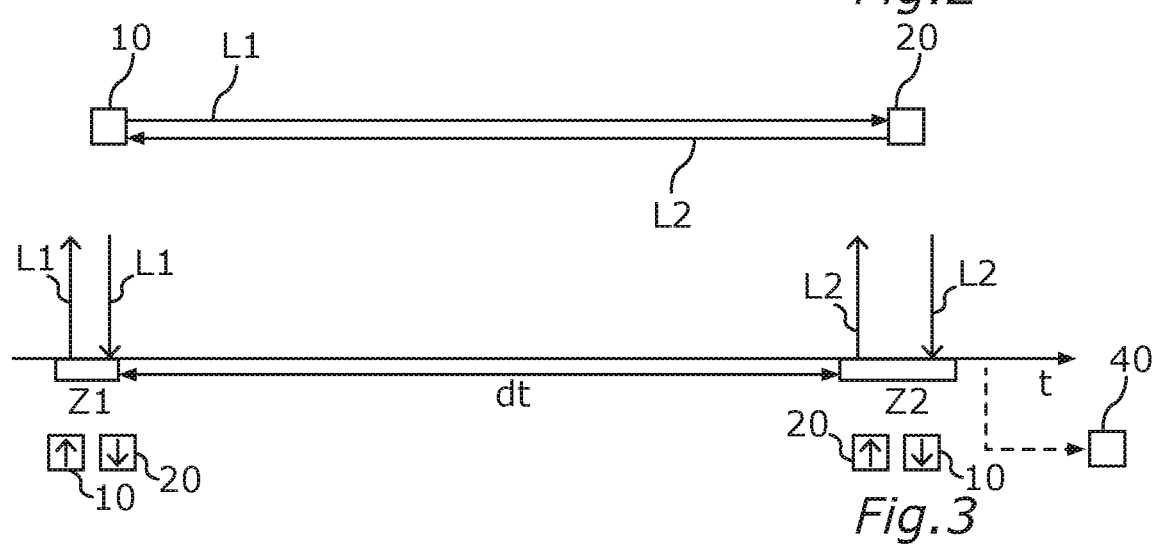
Figure 4:
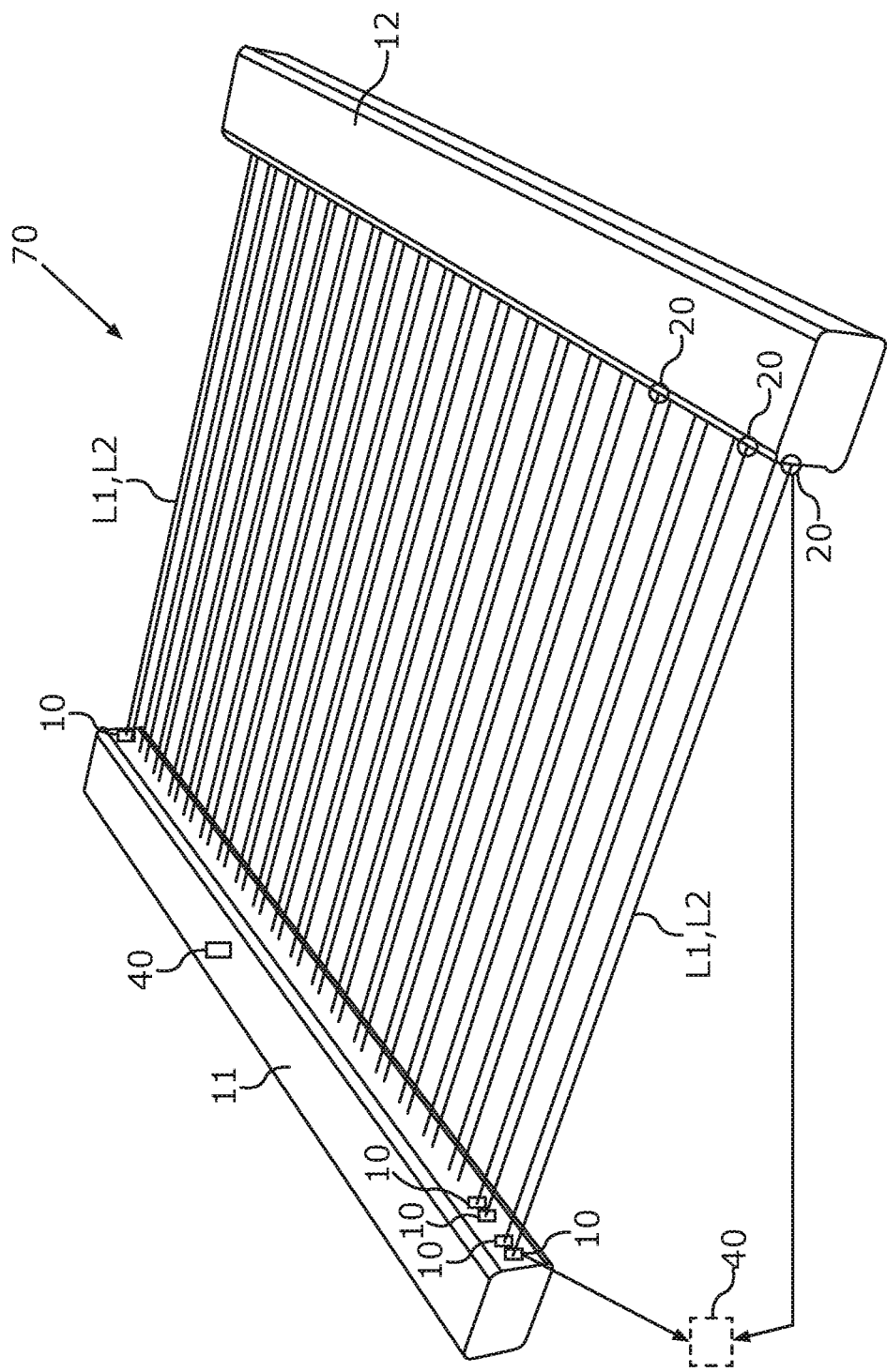
Figure 5:
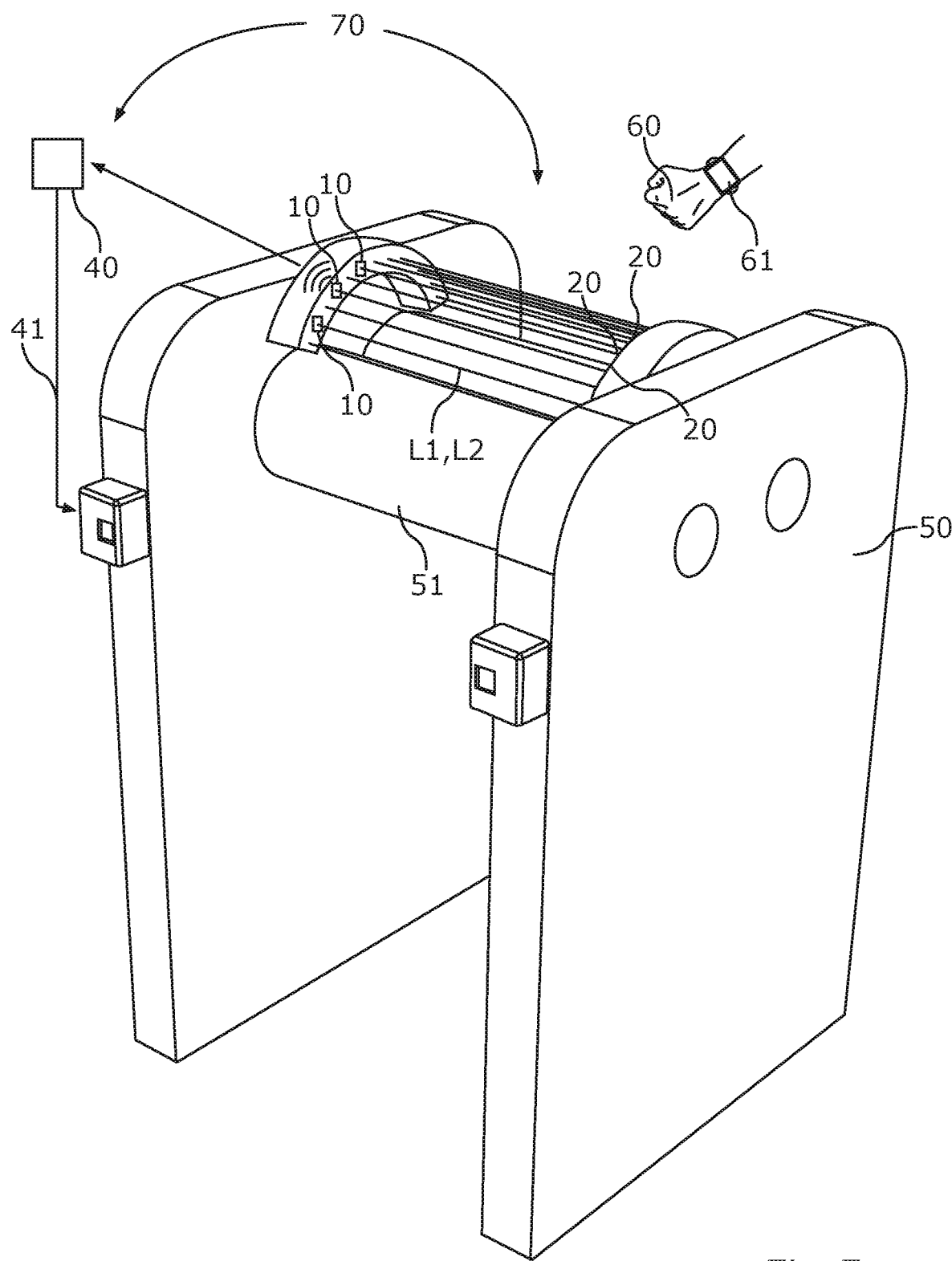
Figure 6:
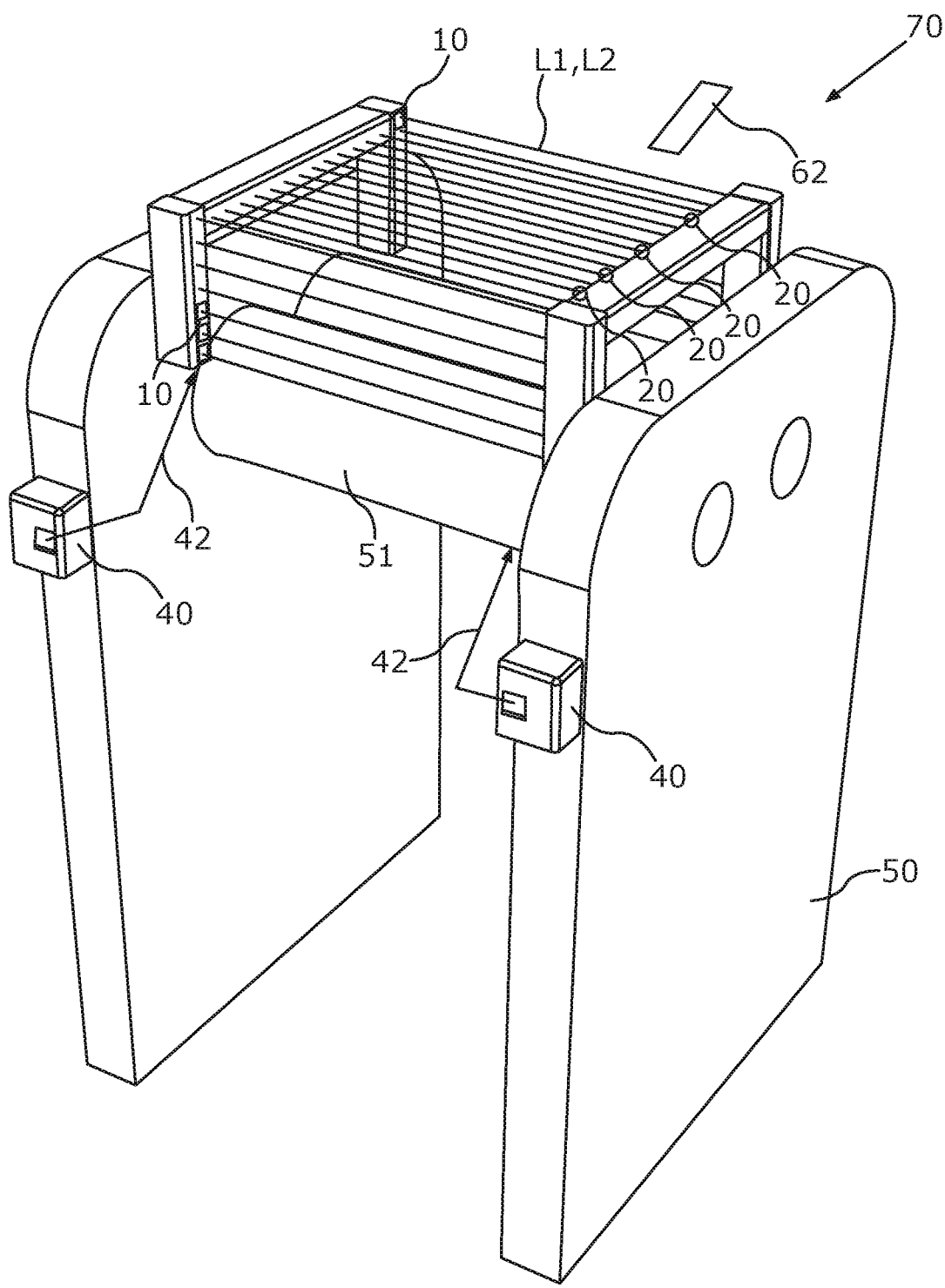
Figure 7:
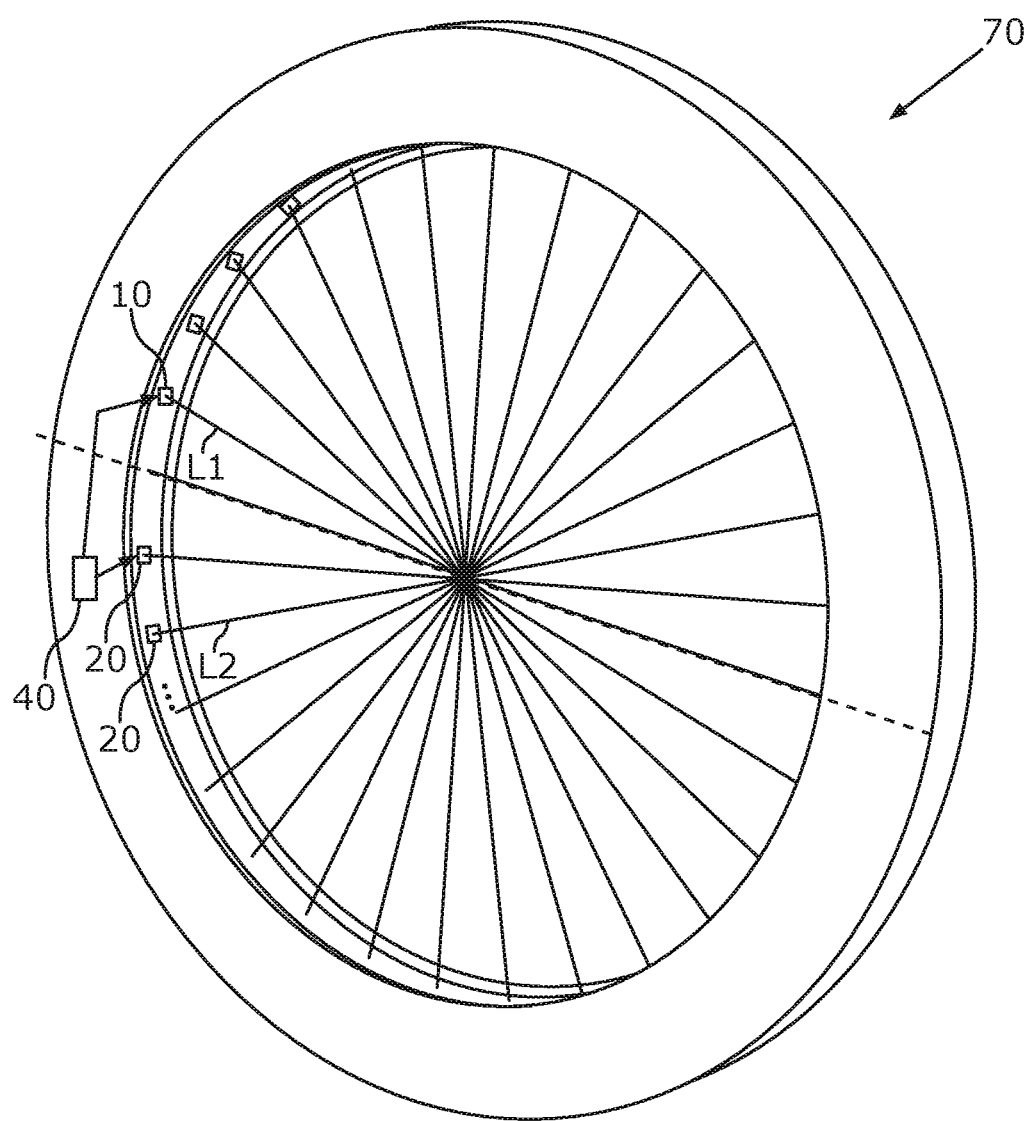

Therein shows:

FIG. 1 a schematic illustration for determining a reflecting object between a first and second transceiver unit;

FIG. 2 a schematic illustration for determining a non-reflecting object between the first and the second transceiver unit;

FIG. 3 a schematic illustration for determining a functionality of the safety device;

FIG. 4 a schematic representation of a light barrier that is realized with several first and second transceiver units;

FIG. 5 a schematic representation of the safety device with a machine; wherein a predetermined area of the machine is secured by a semi-circular light barrier;

FIG. 6 a schematic representation of the safety device with a machine, the predetermined area of which is secured by a U-shaped light barrier; and FIG. 7 a safety device, in which the first and second transceiver units are each arranged in semi-circular manner.

DESCRIPTION OF THE INVENTION

FIGS. 1 to 3 schematically show the way a safety device 70 functions. FIG. 1 shows the situation corresponding to the determining of a reflecting object 31 between a first transceiver unit 10 and a second transceiver unit 20. The first transceiver unit 10 emits a first light beam L1 in the direction of the second transceiver unit 20. Equally, the second transceiver unit 20 emits a second light beam L2 temporally offset in the direction of the first transceiver unit 10. Due to the reflecting object 31 these two light beams L1 and L2 cannot reach the respective other transceiver unit. Due to the reflection properties of the reflecting object 31 a reflected light beam L1r as well as a second reflected light beam L2r occur. These reflected light beams L1r and L2r are received by the transceiver units 10, 20.

A time axis t shown in FIGS. 1 to 3 schematically shows a first time slot Z1 as well as a second time slot Z2. These two time slots Z1, Z2 are temporally separated from each other by a predetermined time offset dt. The time offset may be equally regarded as interval.

In the case of FIG. 1 the first transceiver unit 10 in a first time slot Z1 emits the first light beam L1. Between the first transceiver unit 10 and the second transceiver unit 20 the reflecting object 31 is arranged. Due to the reflection at the reflecting object 31 the first transceiver unit 10 receives the first reflected light beam L1r equally in the first time slot Z1. Accordingly, the second transceiver unit 20 receives the second reflected light beam L2r in the second time slot Z2.

The predetermined time offset or interval dt as a rule is configured to be clearly larger than a time period of the first or the second time slot. It is to be considered that the represented time scales t are merely schematic. The first time slot T1 or the second time slot Z2 each have a temporal expansion of only few nanoseconds. In contrast thereto, the predetermined time offset dt as a rule amounts to few milliseconds. For the sake of better representation of the operating principle the time scales t therefore are not represented to scale. An evaluation unit 40 may determine which of the two transceiver units receives light beams in which time slot. The evaluation unit 40 may acquire the information represented by the time scales t.

FIG. 2 schematically shows the operating principle of the safety device 70 when determining a non-reflecting object 32. If the non-reflecting object 32 is arranged between the two transceiver units 10, 20, the second transceiver unit 20 cannot receive the first light beam L1. The first light beam L1 in this case does not reach the second transceiver unit 20. The same is true for the second light beam L2. With regard to the time scale t this results in the situation shown in FIG. 2.

The first transceiver unit 10 emits the first light beam L1 in the first time slot Z1. In the second time slot Z2 the second transceiver unit 20 emits the second light beam L2 in the direction of the first transceiver unit 10. Due to the non-reflecting object 32 these two light beams are hindered in their propagation. The light beams L1 and L2 may for instance be absorbed. The evaluation unit 40 accordingly cannot detect a received light signal. Neither the first nor the second transceiver unit receive a light beam, a light pulse, or any light signals from the first or second transceiver unit.

Preferably, the light beams L1 and L2 have a wavelength in the infrared range. The wavelength of the first light beam L1 and of the second light beam L2 in this connection are selected in such a way that the transceiver units 10, 20 do not interpret environmental light as the first light beam L1 or the second light beam L2. The emitting of the two light beams or the receiving of the light beams at the respective transceiver units 10, 20 may be captured or registered by the evaluation unit 40. In particular, the evaluation unit 40 may capture the respective points in time of the emitting or receiving of the respective light beams L1, L2. The evaluation unit 40 may define in each case a first or second time slot based on a starting time and an end time. In the case of FIG. 1 the evaluation unit 40 registers the reflecting object 31 between the first and second transceiver unit. If the evaluation unit 40, however, does not register any received light beams, this may be indicative of the non-reflecting object 32. The situation shown in FIG. 2, however, in rare cases might be equally due to a partial defect of the safety device 70.

For this reason the invention preferably suggests to perform a function check or a functionality test of the safety device 70. FIG. 3 schematically shows the principle of this function check. The function check is then preferably only performed when there is no object arranged between the first transceiver unit 10 and the second transceiver unit 20. In this case the first light beam L1 can reach the second transceiver unit 20 unhindered. The same applies in analogy to the second light beam L2, which is emitted by the second transceiver unit 20. The time scale t of FIG. 3 shows a corresponding time information, which the evaluation unit 40 acquires.

In the first time slot Z1 the first light beam L1 is emitted by the first transceiver unit 10. This first light beam L1 is equally received in the first time slot Z1 by the second transceiver unit 20. In order to point out that the first light beam L1 is emitted by the first transceiver unit 10 and equally is received in the first time slot Z1 by the second transceiver unit 20, below the time scale t the respective associated transceiver unit is suggested. At the same time an arrow head of the suggested light beams L1, L2 indicates whether the respective light beam is emitted or received. An arrow head pointing upward indicates an emitting, an arrowhead pointing downward indicates a receiving. These arrowheads have the same meaning in FIGS. 1 and 2. In the second time slot Z2 the second light beam L2 is emitted and equally in the second time slot Z2 the second light beam L2 is received by the first transceiver unit 10. Thus, the evaluation unit 40 can check a correct functioning of the safety device 70. This function check may be performed permanently if no object is present between the transceiver units 10, 20. Preferably, a permanent function check of the safety device 70 is performed.

The intervals of the respective light beams in the same time slot shown in FIGS. 1 and 3 as a rule are clearly smaller than the predetermined interval dt between the two time slots Z1 and Z2. The intervals of the respective light beams in the same time slot may amount to less than 5 ns. In comparison with the predetermined interval dt (several ms) these minor time differences in the range of nanoseconds may be neglected. Consequently, in FIG. 3 the second transceiver unit 20 receives the first light beam L1 immediately after it is emitted by the first transceiver unit 10. FIGS. 1 to 3 by reference to the time scales t each show schematically which information the evaluation unit 40 acquires. The evaluation unit 40 in this connection may assign the received information to one of these represented time scales t. Thereby the evaluation unit 40 may monitor a functionality of the safety device 70 and at the same time determine a presence of an object between the first and second transceiver unit. In the case of a detected object the evaluation unit 40 may further determine whether the detected object is a reflecting object 31 or a non-reflecting object 32. Depending on the kind of detected object the evaluation unit 40 may generate different control signals for controlling a machine 50.

FIG. 4 shows in an exemplary way an arrangement of several first transceiver units 10 and several second transceiver units 20. The several first transceiver units 10 are arranged along a line on a first printed circuit board 11. The several second transceiver units 20 are arranged along a line of a second printed circuit board 12. Between these transceiver units the first and second light beams L1, L2 are suggested in an exemplary way. These several first and second light beams span a light barrier or a light curtain, respectively. This light curtain as a rule is non-visible to the human eye. The evaluation unit 40 may for instance be arranged in the area of the first printed circuit board 11 or second printed circuit board 12. It may equally be arranged externally. The first and second transceiver units 10, 20 may transfer information to the evaluation unit 40 or the evaluation unit 40 may retrieve information from the respective transceiver units. The schematic operating principles shown in FIGS. 1 to 3 may be transferred mutatis mutandis and in analogy to several transceiver units. Preferably, a number of the first transceiver units 10 corresponds exactly to a number of the second transceiver units 20. An arrangement of the first transceiver units 10 is preferably configured to be congruent with an arrangement of the second transceiver units 20.

The safety device 70 is in particular realized by two opposite light barrier units of the same size. The several first transceiver units 10 may represent a first light barrier unit, the several second transceiver units 20 may represent a second light barrier unit. The light beams may be emitted pulsed with defined duration and interval temporally offset by the two light barrier units. The time control of the light beams may facilitate a determining of an existence of the object. If for instance at the first transceiver unit 10 there is no light signal present, the second light beam L2 would be interrupted. In this case it may be concluded that there is a non-reflecting object in the beam path. By the function check represented in FIG. 3 it may be determined whether the first transceiver unit 10 has a defect. If at the first transceiver unit 10 the first reflected light beam L1r is received, this is indicative of a reflecting object 31. This situation may for instance be indicative of a reflecting glove or a reflecting bracelet. In this case the evaluation unit 40 prefers a control signal for immediate shutdown of the machine 50.

The evaluation unit 40 may further determine which side of an object is configured to be reflecting or non-reflecting. For instance the first reflected light beam L1r might be received by the first transceiver unit 10, while the second transceiver unit 20 does not receive a light beam. This scenario would represent an overlap of FIG. 1 with FIG. 2. On a first side (left in FIGS. 1 and 2) the object would be reflecting, on a second side (right in FIGS. 1 and 2) the object would be non-reflecting, provided that there is no defect of the safety device 70.

FIG. 5 in an exemplary way shows the safety device 70 with the machine 50. The machine 50 according to FIG. 5 comprises two rolls 51. These rolls 51 represent a predetermined area 51 of the machine 50. The predetermined area 51 is in particular a dangerous area involving great risks for a user. Around this predetermined area 51 a semi-circular light barrier is schematically suggested. This light barrier comprises several first transceiver units 10 as well as several second transceiver units 20. The transceiver units 10, 20 are preferably connected with the evaluation unit 40 in terms of data. Thus, between the respective transceiver units 10, 20 and the evaluation unit 40 an exchange of information can take place.

FIG. 5 schematically shows a hand 60. In the area of a wrist a reflection bracelet 61 is arranged. In many cases it is envisaged that the machine 50 can only be activated by a reflection bracelet 61 or another reflection unit to be worn. The machine 50 according to FIG. 5 can preferably be activated and operated only by the reflection bracelet 61. A further monitoring that is not shown here can moreover determine whether the user wears the reflection bracelet 61. If the hand 60 approached the light curtain in FIG. 5, to begin with, the non-reflecting object 32 would be determined. The hand 60 as such as a rule is configured to be non-reflecting. By a corresponding reflection glove, however, the hand 60 may equally be configured to be reflecting. In the case of a correspondingly large distance of the light barrier from the rolls 51 shown in FIG. 5 upon the hand 60 entering an area within the light barrier no immediate shutdown of the machine must be effected yet. Thus, it may for instance be ensured that a user can make adjustments to the respective transceiver units with his or her hand 60.

However, if the user moved his hand 60 further in the direction of the rolls 51, the reflection bracelet 61 would inevitably be moved to the space in between the first transceiver unit and the second transceiver unit. In this case at least one of the two light beams L1 or L2 would be reflected. The evaluation unit 40 would determine the scenario shown in FIG. 1. The scenario according to FIG. 1 transferred to the example of FIG. 5 would mean that an extremely critical state has occurred. The hand 60 of the user approaches the dangerous area of the machine 50. The rolls 51 might catch the hand 60 of the user and thus cause considerable injuries. In order to prevent this undesired scenario, it is preferably envisaged that the evaluation unit 40 immediately after determining the reflecting object 31 generates a first control signal 41, which immediately switches off or deactivates the machine 50.

FIG. 6 shows the machine 50, in which the predetermined area 51 is secured by a U-shaped light barrier. According to the example of FIG. 6 several evaluation units 40 may be arranged on the machine 50 or in its surroundings. The evaluation units 40 may be arranged additionally or alternatively outside the machine 50. Equally in FIG. 6 the light barrier, which as a rule is not visible to humans and is formed by the first and second light beams L1 and L2, is schematically represented.

FIG. 6 schematically shows a robot arm 62. This robot arm 62 is frequently configured to be non-reflecting. Thus, the robot arm 62 represents the non-reflecting object 32. If the robot arm 62 approaches the predetermined area 51, it inevitably passes the light barrier. In this case individual light beams of the light barrier are affected with regard to their propagation. If the robot arm 62 interrupts the first light beams L1 or the second light beams L2 between the first and the second transceiver unit, the first light beam L1 cannot reach the second transceiver unit 20. In this case the evaluation unit 40 would register the situation shown in FIG. 2. Preferably, the evaluation unit 40 generates a second control signal 42. This second control signal 42, however, is not configured to switch off the machine 50. This is for instance because it is virtually desired that the robot arm 62 advances into the predetermined area 51. If for instance the robot arm 62 is meant to guide steel plates to the rolls shown in FIG. 6, it is required that the robot arm 62 can approach the rolls 51 without a shutdown of the machine 50 being effected thereby.

In this situation a great advantage of the invention becomes apparent. The safety device 70 facilitates not only a mere object capturing between the first transceiver unit 10 and the second transceiver unit 20, but moreover the captured object can be classified in more detail at least with regard to its reflection properties. By the safety device 70 it may be determined whether the object is configured to be reflecting or non-reflecting. If in the example of FIG. 6 the hand 60 shown in FIG. 5 with the reflection tape 61 approached the machine 50, the evaluation unit 40 instead of the second control signal 42 would generate the first control signal 41. In this case the machine 50 would be switched off or stopped immediately after determining the reflecting object 31.

FIGS. 5 and 6 show in an exemplary way that the several first transceiver units 10 and several second transceiver units 20 may be arranged differently. These respective arrangements are configured to be arranged congruent with each other. This means in particular that a first arrangement of the several first transceiver units 10 by a congruence mapping may be transferred into a second arrangement of the several second transceiver units 20.

In FIG. 7 a further possible arrangement of the several first and second transceiver units is shown. The several first transceiver units 10 are arranged along a first semicircle. The several second transceiver units 20 are arranged along a second semicircle. From this results a circular arrangement of the several first and second transceiver units 10, 20. The arrangement of the first transceiver units 10 shown in FIG. 7 may be transferred by a point mirroring into the second arrangement of the several second transceiver units 20. In the example of FIG. 7 the evaluation unit 40 is arranged within a ring-shaped printed circuit board. The respective transceiver units are arranged on the inner side of the ring-shaped printed circuit board. The arrangement of the several first and second transceiver units 10, 20 shown in FIG. 7 may for instance be employed in the area of a tube, into which a user must not reach.

FIGS. 5 to 7 clearly show that the several first and second transceiver units 10, 20 may be arranged differently. Preferably, the arrangement of the several first and second transceiver units 10, 20 is selected in dependence on the predetermined area 51 of the machine 50. By the several first and second transceiver units 10, 20 a light barrier or a light curtain that reliably secures the predetermined area 51 is generated. This means above all that it is not possible for a user to approach the predetermined area 51 without being recognized or to enter the predetermined area 51 without being noticed by the evaluation unit 40.

Thus, the safety device 70 allows for a selective recognition of objects between the first transceiver unit 10 and the second transceiver unit 20. The arrangement of the several first and second transceiver units 10, 20 may be configured to have any random geometry. Preferably, the first arrangement of the first transceiver units 10 corresponds to the second arrangement of the second transceiver units 20. These two arrangements are preferably congruent with each other. Thus, a light barrier may be realized for a circular opening, as shown in FIG. 7.

By an arrangement of four light barriers in the 90° angle or a closed circle for round openings the responsivity of the evaluation unit 40 may be raised once more. By the safety device 70 ideally a higher safety class for the machine 50 can be achieved. By the safety device 70 it can be determined whether the first light beam L1 is interrupted, originates from the opposite transceiver unit, or the first light beam L1 is received by reflection at the reflecting object 31 at the first transceiver unit 10.

Although the present invention has been described in detail on the basis of the exemplary embodiments, it is obvious to the person skilled in the art that the invention is not limited to these exemplary embodiments, but rather that modifications are possible in such a way that individual features are omitted or other types of combinations of features can be realized, without leaving the scope of protection of the appended claims. In particular, the present disclosure encompasses all combinations of the individual features shown in the different examples of embodiment, so that individual features that are described only in conjunction with one exemplary embodiment can also be used in other exemplary embodiments or combinations of individual features that are not explicitly shown can also be employed.

What is claimed is:

1. A safety device for a machine, comprising:
a first transceiver unit for emitting a first light beam in a first time slot and for receiving a second light beam;
a second transceiver unit arranged for emitting the second light beam in a second time slot that is different from the first one and for receiving the first light beam; and
an evaluation unit configured to determine a reflecting object between the first transceiver unit and the second transceiver unit, only if the first light beam is received by the first transceiver unit in the first time slot or the second light beam by the second transceiver unit in the second time slot, and to determine a non-reflecting object between the first transceiver unit and the second transceiver unit, only if by neither of the two transceiver units in both time slots one of the two light beams is received.

2. The safety device according to claim 1, wherein the evaluation unit is configured and arranged to determine a functionality of the safety device, only if the first light beam is received by the second transceiver unit in the first time slot and/or the second light beam is received by the first transceiver unit in the second time slot.

3. The safety device according to claim 1, wherein the evaluation unit is configured and arranged to generate based on the determining of the reflecting or non-reflecting object a predetermined control signal for the machine.

4. The safety device according to claim 1, wherein the first time slot is temporally separated from the second time slot by a predetermined interval, which exceeds a running time of the first light beam from the first transceiver unit to the second transceiver unit.

5. The safety device according to claim 1, further comprising several first transceiver units and several second transceiver units, wherein each first transceiver unit is assigned a second transceiver unit for receiving the first light beam.

6. The safety device according to claim 5, wherein the several first transceiver units are arranged along a first line, the several second transceiver units are arranged along a second line and the first line is configured and arranged to be congruent with the second line.

7. The safety device according to claim 5, wherein the several first transceiver units and the several second transceiver units are each arranged in a rectilinear, semi-circular, circular, U-shaped, and/or rectangular manner.

8. The safety device according to claim 1, further comprising a rolling machine wherein the evaluation unit is configured and arranged to switch off the machine in the case of determining the reflecting object.

9. The safety device according to claim 8, wherein the several first and second transceiver units are arranged so that a predetermined area of the machine is accessible only by determining the reflecting object and/or by determining the non-reflecting object.

10. A method for operating a safety device for a machine, comprising the steps of:
    emitting a first light beam in a first time slot by a first transceiver unit, wherein the first transceiver unit is configured for receiving a second light beam;
    emitting the second light beam in a second time slot that is different from the first time slot by a second transceiver unit, wherein the second transceiver unit is configured for receiving the first light beam;
    determining a reflecting object between the first transceiver unit and the second transceiver unit, only if the first light beam is received by the first transceiver unit in the first time slot or the second light beam is received by the second transceiver unit in the second time slot; and
    determining a non-reflecting object between the first transceiver unit and the second transceiver unit, only if by neither of the two transceiver units in both time slots one of the two light beams is received.

11. The method according to claim 10, wherein the emitting of the first light beam is effected temporally offset from the emitting of the second light beam at a predetermined interval.

12. The method according to claim 10, wherein the first light beam and the second light beam are emitted in an alternately periodically repeating manner.

13. The method according to claim 10, wherein a functionality of the safety device is determined, only if the first light beam is received by the second transceiver unit in the first time slot and/or the second light beam is received by the first transceiver unit in the second time slot.

14. The method according to claim 10, further comprising the step of:
    generating an error signal if during a predetermined time period neither of the two light beams is received by the first transceiver unit and/or the second transceiver unit.

15. The safety device according to claim 5, wherein the several first and second transceiver units are arranged so that a predetermined area of the machine is accessible only by determining the reflecting object and/or by determining the non-reflecting object.

* * * * *